United States Patent [19]

Burrus

[11] 4,052,996
[45] Oct. 11, 1977

[54] FLUID PRESSURE RELAY

[75] Inventor: Billy Steve Burrus, Tulsa, Okla.

[73] Assignee: Combustion Engineering, Inc., Windsor, Conn.

[21] Appl. No.: 689,607

[22] Filed: May 24, 1976

[51] Int. Cl.² .................................................. G05D 16/10
[52] U.S. Cl. ............................... 137/85; 137/116.3; 137/627.5
[58] Field of Search ................ 137/85, 116.3, 116.5, 137/627.5; 91/416, 417 R, 376, 433

[56] References Cited

U.S. PATENT DOCUMENTS

| | | | |
|---|---|---|---|
| 2,121,389 | 6/1938 | Morin et al. | 91/433 X |
| 3,055,384 | 9/1962 | Puster | 137/85 |
| 3,472,264 | 10/1969 | Petry | 137/116.5 |
| 3,536,089 | 10/1970 | Sarbach | 137/116.3 |

Primary Examiner—Robert G. Nilson
Attorney, Agent, or Firm—Arthur L. Wade

[57] ABSTRACT

A primary element is connected to a control element of a fluid pressure relay to move the element to positions at which fluid pressure outputs of the relay will be generated to represent the positions.

3 Claims, 3 Drawing Figures

FLUID PRESSURE RELAY

BACKGROUND OF THE INVENTION

1. Field of the Invention

The present invention relates to a fluid pressure relay which generates an output representative of positions of a primary element over a predetermined range. More specifically, the invention relates to the type of fluid pressure relay with an output chamber valved between a fluid pressure supply and exhaust to generate a pressure representative of the position of a primary element without a continuous bleed of supply fluid to exhaust at a steady state condition of the primary element and relay.

2. Description of the Prior Art

The fluid pressure relay has been extensively developed in the prior art. I have participated in this development as evidenced by my U.S. Pat. No. 3,840,044 issued Oct. 8, 1974. However, the developers in the art have not produced one of these simple fluid pressure relays without excessive reaction force on the primary element and no wastage from the fluid pressure source at steady state conditions. The art is rampant with claims for relays that will give this performance. However, I have found no relays which justify these claims.

SUMMARY OF THE INVENTION

A primary object of the invention is to provide a fluid pressure relay with a three-way valve whose plug element is positioned by a primary element in relation to seats in a movable wall to regulate the supply of fluid pressure to a control chamber and exhaust of fluid pressure from the control chamber representative of the position of the primary element.

Another object is to relate this plug element to its seats so that, with steady state conditions at any position of the primary element within its predetermined range, there will be no continuous exhaust of fluid from the supply.

The invention contemplates a housing with a straight cylindrical bore having a piston dividing the bore into two chambers. A bore is formed through the piston and has a counterbore to form a seat facing toward a first of the chambers. A plug element is spring-urged toward the seat from the first chamber. A second spring is positioned in the second chamber of the housing to urge the piston and its seat toward the plug element. A source of fluid pressure is connected to the first chamber and is valved to the second chamber by the plug element across the piston bore seat. A hollow tubular element is connected to a primary element and is sealed to, and extends through, the side of the housing and into the piston bore to alternately connect the second chamber to exhaust through its passage and unseat the plug element while sealing the exhaust passage and connecting the source of fluid pressure to the second chamber.

The invention further contemplates that in the arrangement of parts in the relay the primary element moves to initiate changes in the fluid pressure from the second, output, chamber. If the primary element advances the hollow tubular element toward the plug element, the plug element unseats to flow pressure fluid to the output chamber until the pressure adds enough force to that force of the spring to move the piston and its seat into reengagement with the plug element. If the primary element withdraws the hollow tubular element from its engagement with the plug element, the output chamber is connected to exhaust through the tubular element until the pressure subtracts enough of its force from the spring force to move the piston and its seated plug element into reengagement with the the plug element. Upon both reengagements, and no further movement of the primary element, the fluid pressure supply and exhaust are positively sealed from the output chamber.

Other objects, advantages, and features of this invention will become apparent to one skilled in the art upon consideration of the written specifications, appended claims, and attached drawings, wherein;

DESCRIPTION OF THE PREFERRED EMBODIMENT

Figure 1:
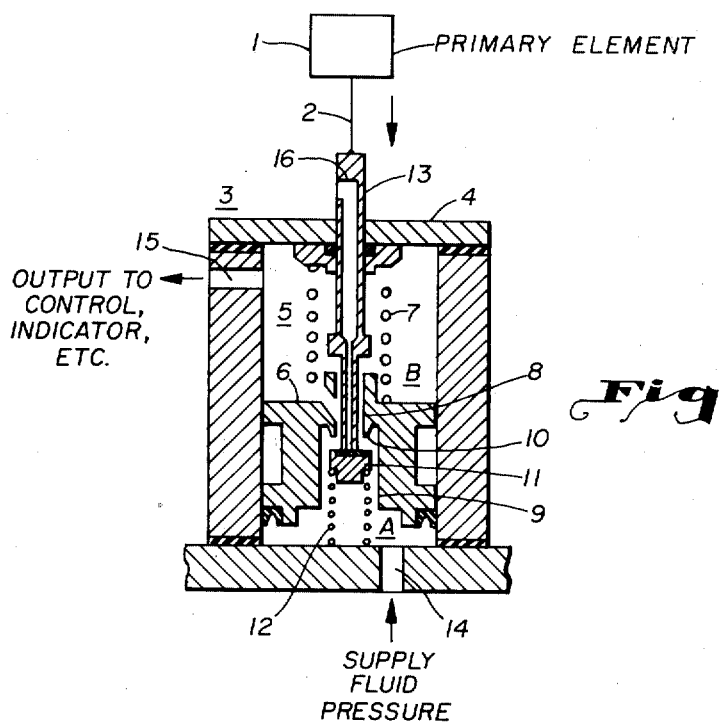
FIG. 1 is a sectional elevation of a fluid pressure relay in which the invention is embodied and connected to a primary element to increase its output pressure.

All the drawings disclose the same fluid pressure relay connected to primary element 1 in the form of a "block box." The primary element takes positions within a range representative of variables to which it is directly exposed. No purpose would be served by disclosing in detail primary element 1, or the linkage 2 between the primary element and relay.

Relay 3 has a housing 4. This housing may be given many variations in form, but all forms must include the equivalent of cylinder 5. Cylinder 5 does not have to be cylindrical, although, in this art, that would be the preferred form.

Cylinder 5 is sealed at each end by the housing structure and is divided into two chambers, A and B, by a piston 6. A spring 7 is mounted in chamber B to urge piston 6 in one direction. Bore 8 through piston 6 is counterbored at 9 to form a seat 10 toward chamber A. Plug element 11 is urged by spring 12, in chamber A, toward seat 10. Tubular element 13 is extended from linkage 2 through the housing 4 wall of chamber B and down through bore 8 to engage plug element 11 with its open end.

A source of fluid pressure supply is connected to chamber A by housing passage 14. The pressure generated in chamber B is connected by housing passage 15 to a controlled or indicating unit not shown.

FIG. 1 discloses the relay actuated by the primary element to unseat plug element 11 from seat 10. The higher pressure of the source in chamber A is thereby opened to chamber B across seat 12. The fluid pressure will then increase in chamber B until it adds enough force to that of spring 7 to move piston 6, and its seat 10, toward plug 11 to reseat plug 11 on seat 10. At the new position of tubular element 13 - primary element 1 the output of chamber B has the higher fluid pressure value which represents that position.

Figure 2:
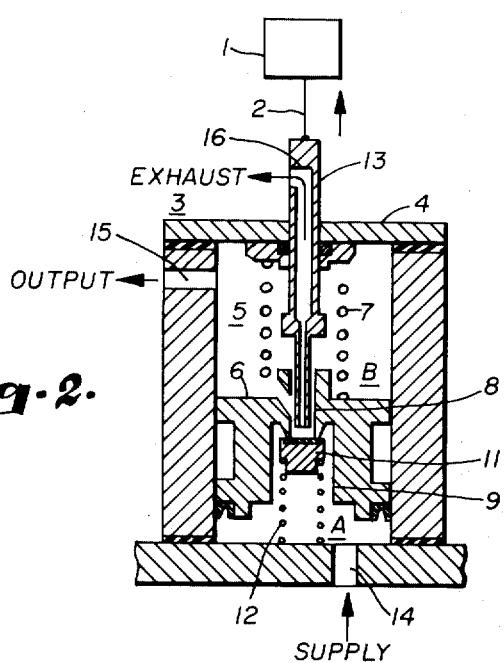
FIG. 2 is similar to FIG. 1 but with the relay connected to the primary element to decrease its output pressure.

FIG. 2 discloses the relay, actuated by the primary element, unseating the end opening of tubular element 13 from plug element 11 while plug element 11 remains seated on seat 10. The central passage of tubular element 13 is vented to exhaust, external the relay, at 16. Therefore, unseating the open end of tubular element 13 from plug 11 vents chamber B. The result is a reduction of the pressure in chamber B, a subtraction of the force of chamber B from the combined force of spring 7 and the chamber B pressure. Piston 6 and plug element 11 then move toward reseating of the open end of tubular element 13 on plug element 11. At the second new position of tubular element 13 - primary element 1 the output of chamber B has a lower fluid pressure value representative of the second new position.

Figure 3:
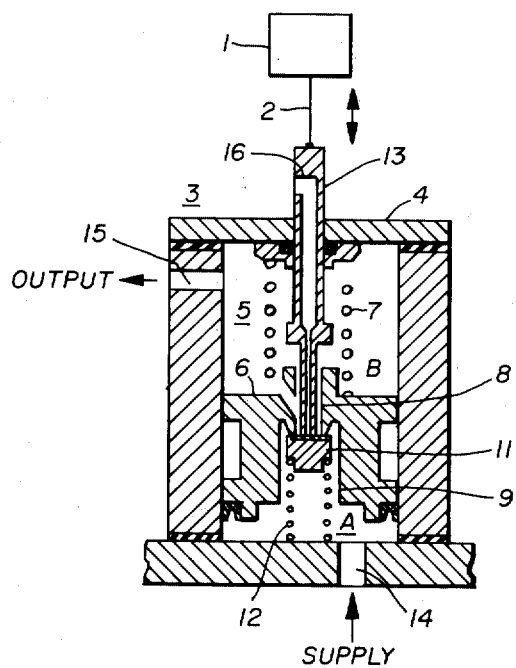
FIG. 3 is similar to the preceeding FIGS. but with the relay and primary element in their steady state condition.

FIG. 3 discloses the relation between the structures of the relay after actuation and reseating of the plug element into engagement with both seat 10 and the open end of tubular element 13. Without further movement of tubular element 13, the relay and primary element are in a steady state condition. The primary element is not moving in FIG. 3. Chamber B is sealed from both supply and exhaust, the pressure within chamber B having been generated to the value which will add enough force to that of spring 7, on piston 6 to balance the force of the fluid pressure supply connected to chamber A and whatever small contribution of force is made by spring 12.

CONCLUSION

In a simple, structural, definition of the invention, the disclosure shows a housing 4 with a straight cylindrical bore 5. A piston 6 is located within the housing bore and is sealed to the bore walls, dividing the housing bore into two chambers A and B. Bore 8 is extended through the piston and has a seat 10 formed by a counterbore. A plug element 11 is positioned within the bore and urged by a spring 12 toward engaging the seat. Meanwhile, a spring 7 is mounted on the other side of piston 6 and bears upon the piston to urge the piston seat toward the plug element. A tube 13 is extended with its open end into the piston bore 8 and through seat 10 to engage plug 11. Movement of the tube 13 will then unseat plug 11 against spring 12 force or disengage the open end of tube 13 from plug 11. A supply 14 of power fluid is connected permanently to the bore chamber A on the plug side of the piston and the tube 13 is connected to exhaust external of the housing 4. Therefore, each new position of the tube 13 will generate an output of the relay by valving the bore chamber B on the side of the piston opposite the plug element, the output fluid pressure being representative of the position of tube 13. At each new position, plug element 11 engages both seat 10 and the open end of tube 13 after the output fluid pressure is established. Supply 14 is therefore sealed against bleed of power fluid to exhaust.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention, having been described, what is claimed is:

1. A fluid pressure, non-bleed, position pilot valve, including,
a housing having a straight cylindrical bore,
a piston within the housing bore and sealed to the walls of the housing bore to divide the housing bore into two chambers,
a bore extended through the piston and parallel to the piston path in the housing bore,
a seat within the bore through the piston and between the chambers on each side of the piston,
a plug element positioned within the bore through the piston and urged by a spring toward engaging the seat within the bore through the piston,
a spring mounted within the housing bore chamber opposite the plug element to exert its force on the piston in moving the piston seat toward the plug element,
a supply of power fluid connected to the housing bore chamber on the plug element side of the piston,
an outlet for the fluid pressure generated in the housing bore chamber on the side of the piston opposite the plug element,
and a tube extending its open end into the piston bore seat to engage the plug element to first move the plug element from the piston bore seat and next move away from engagement with the plug element to vent the housing bore chamber on the side of the piston opposite the plug element,
whereby each position of the tube will develop a differential pressure across the piston which will move the piston until the plug element engages the piston seat and open end of the tubular positioner to seal the housing chambers on each side of the piston from each other and the chamber opposite the plug element from exhaust through the tubular positioner.

2. A fluid pressure pilot valve, including,
a housing with a cylindrical bore closed on each end,
a piston mounted within the housing bore so as to reciprocate within the housing bore while sealed to the housing bore walls and dividing the housing bore into a first chamber and a second chamber,
a bore extended axially through the piston and axially aligned with the bore through the piston by a counterbore from the direction of the first of the housing bore chambers which forms a seat within the bore through the piston,
a plug element positioned within the bore through the piston and urged by a spring in the first of the housing bore chambers toward engagement with the seat,
a spring mounted within the second of the housing bore chambers to apply its force on the piston and move its seat toward the plug element,
a tube extending through the wall of the second housing chamber and sealed to the chamber wall and extending into the bore through the piston to sealingly engage the plug element while unseating the plug element and its bore connected to exhaust external of the housing which is opened to the second chamber when the tube end disengages from the plug element,
a supply of power fluid permanently connected to the first bore, chamber,
and an outlet for the fluid pressure generated in the second bore chamber,
whereby each position of the tube will initially unseat the plug element and increase the pressure from the supply in the second bore chamber or disengage the end of the tube from the seated plug element and decreases the pressure to exhaust in the second bore chamber, either initial result in pressure change in the second chamber resulting in movement of the piston to both reseat the plug element and engage the plug element with the end of the tube, the pressure in the second chamber representing the new position of the tube and connected to a means manifesting the new tube position.

3. A control system developing a fluid pressure output in response to a primary element moved over a range of positions, including, a primary element responsive to a variable condition in taking up positions over a range, a tubular element linked to the primary element and arranged to exhaust the bore of the tube, a housing arranged to receive one end of the tubular element through a seal in a wall of the housing and extend the end of the tube parallel the axis of a straight cylindrical bore of the housing, a piston positioned in the housing bore in dividing the housing bore into two chambers, a seat formed within a bore of the piston and receiving the tubular element, a plug member arranged within the piston bore to engage the piston bore seat and to be engaged by the open end of the tubular element, a first spring within the housing arranged to urge the piston to engage its bore seat toward the plug member, a second spring within the housing arranged to urge the plug member to engage the bore seat, a supply of fluid pressure for the housing chamber on the plug side of the piston, and an outlet for fluid pressure generated in the housing chamber on the tubular element side of the piston, whereby each position of the tubular element will uncouple the plug element from either the piston bore seat or the tubular element to generate the pressure differential across the piston which will move the piston until the plug element reengages the seat and tubular positioner to seal the output chamber with a pressure therein representative of the new position of the tubular element and primary element.

* * * * *